United States Patent [19]
Chisholm

[11] 3,929,105
[45] Dec. 30, 1975

[54] ROTARY ENGINE

[76] Inventor: Lloyd Duncan Chisholm, 100 Lawrence Ave., Thunder Bay, Ontario, Canada

[22] Filed: Sept. 25, 1973

[21] Appl. No.: 400,643

[30] Foreign Application Priority Data
Oct. 13, 1972 Canada .................................. 153893

[52] U.S. Cl. ............................ 123/8.09; 123/8.45
[51] Int. Cl.² ........................................ F02B 53/00
[58] Field of Search ............................ 123/8.09, 8.45

[56] References Cited
UNITED STATES PATENTS

| | | | |
|---|---|---|---|
| 1,686,767 | 10/1928 | Saxon | 123/8.45 X |
| 1,976,042 | 10/1934 | Skouland | 123/8.45 X |
| 2,345,561 | 4/1944 | Allen | 123/8.45 |
| 3,769,945 | 11/1973 | Kahre | 123/8.45 X |
| 3,809,020 | 5/1974 | Takitani | 123/8.45 X |

Primary Examiner—C. J. Husar
Assistant Examiner—Michael Koczo, Jr.
Attorney, Agent, or Firm—Watson, Cole, Grindle & Watson

[57] ABSTRACT

Rotary internal combustion engine having five distinct phases of operation comprising an air-charge intake phase, a compression phase, ignition and constant volume combustion phase, expansion phase and exhaust phase. The engine comprises a stator with an undulating working fluid surface and a cooperating vaned rotor wherein the vanes form rotating pockets or chambers of the working fluid through each distinct phase during one revolution of the rotor. The combustion phase takes place at substantially constant volume and is of such a duration to achieve substantially complete combustion.

34 Claims, 11 Drawing Figures

ROTARY ENGINE

FIELD OF INVENTION

My invention relates to certain new and useful improvements in rotary internal combustion engines which will provide a distinct five phase cycle, one phase being combustion at substantially constant volume during which substantially complete combustion of the fuel inside the engine occurs. My engine is less pollutant and uses more of the available energy in the fuel to produce useful work than present engines, while being of a light, simple design with few moving parts.

BACKGROUND

In general, previous internal combustion engines follow a so called four cycle system including intake of a charge of air or air and fuel, compression of the charge to a point of minimum volume expansion and finally exhaust of the gases. Ignition of the charge by fuel injection or spark ignition takes place during the latter part of the compression phase of the cycle, thus any fuel burnt before the point of minimum volume, generally called top dead center, causes an increase in the temperature and pressure of the gases during the compression phase which the engine must work against a completing the compression to the point of minimum volume. The engine is only at top dead center for an instant and burning of the charge continues into the expansion phase. The later fuel is burnt in the expansion phase the less of the total energy is used to push the piston and thus perform useful work. Often as speed increases, burning of the fuel continues well into the expansion phase and even to the point where some of the fuel may be exhausted before it has been burnt to liberate its maximum energy to the working medium; thus this part of the fuel does not do any useful work. This is particularly true in compression ignition engines wherein each droplet of atomized fuel spray must find the necessary amount of oxygen before combustion can take place. As engine speed increases, the droplets must travel farther in seeking out the appropriate amount of oxygen in the short time available. At high speeds in compression ignition engines, there is less time for fuel to find oxygen in the air and combustion continues far into the expansion stroke and sometimes into the exhaust phase and, in extreme cases, fuel is ejected unburned to the atmosphere.

The thermal efficiency of an internal combustion engine depends on how complete a combustion of the fuel is obtained in the engine and it is clearly recognized that as combustion of the fuel approaches a constant volume occurrence, maximum pressure and thermal efficiency are increased. Thermal efficiency is therefore lost when there is an overlap of phases in an engine cycle and fuel is burnt during the compression and the expansion phases. Moreover, the static and dynamic balancing problems with piston engines are well known and the reduction or elimination of such problems through the nature of a rotary engine will generally increase the power to weight ratio of the engine.

SUMMARY OF INVENTION

My invention provides a rotary internal combustion engine which performs a five phase cycle in which complete burning and combustion of the fuel charge takes place at substantially constant volume after intake and full compression and before expansion. Unlike the four cycle engine referred to previously in which phases overlap, the structure of my engine generally prevents overlapping of any phases in the cycle. Whereas in the four and two cycle engines noted previously, combustion takes place during the latter part of the compression phase and continues into the expansion phase, in my engine it is not possible for the compression and combustion phases to overlap and the combustion phase, which takes place at substantially constant volume, will generally not overlap the expansion phase. More particularly, my invention provides a rotary engine with five distinct phases comprising the intake of a charge of air or air and fuel, compression of the charge to a point of least volume, burning of the charge through ignition of the air-fuel charge or by the injection of fuel to the air charge after compression has been completed while maintaining this volume as required, followed by expansion of and subsequent exhaustion of the gases. This five phase cycle is performed in one revolution of the engine rotor. Since burning does not start until after the compression phase, the engine does not work against expanding gases during the compression phase. The combustion of the fuel in a small substantially constant volume provides for a very fast and more complete combustion with resulting higher pressure and temperatures of the gases than in a comparable four cycle engine for the same amount of fuel. The droplets of fuel in the small constant volume do not have far to travel to fine oxygen and this is particularly important in a compression ignition engine. Thorough mixing of the oxygen in the air and the fuel in my engine is accomplished through the high speed of the air charge within a chamber defined by adjacent engine rotor vanes moving past a fuel injector which is recessed in the engine stator. The recess is shaped in such a manner that a portion of the air stream picks up fuel droplets ejected from the injector and is deflected into the main stream causing high turbulence and improved mixing of fuel and air.

In addition, the shape of the recess about the ignition element is such that with a continuous spray of fuel, a combustion blow back occurs from a leading chamber to the folloing chamber thereby enhancing the fuel ignition and burning characteristics of fuel in the following chamber.

The expansion phase in my engine begins after substantially complete, constant volume combustion and therefore all the expansive power of the burnt charge is used during the expansion phase with the gases subsequently being exhausted close to atmospheric pressure. The structure of my engine confines combustion to a substantially constant volume chamber. The actual degree of rotation of holding or arcuate length of the minimum constant volume chamber will depend on the speed at which the engine has been designed to run, on the ignition delay and burning characteristics of the fuel used and on the number of vanes. Nevertheless the arcuate length is sufficient to provide for substantially complete combustion of the fuel before expansion begins. The arcuate length of the minimum constant volume chamber would be kept as short as possible to provide complete burning in any specific engine design and thus avoid unnecessary heat loss to a cooling medium, yet would provide a slight margin over the probable highest engine speed.

Other objects and advantages of my invention will become apparent from an appreciation of the following preferred embodiments, although it should be understood that I do not intend to limit my invention to such preferred embodiments but seek the scope of monopoly as defined in the appended claims.

PREFERRED EMBODIMENTS

Figure 1:
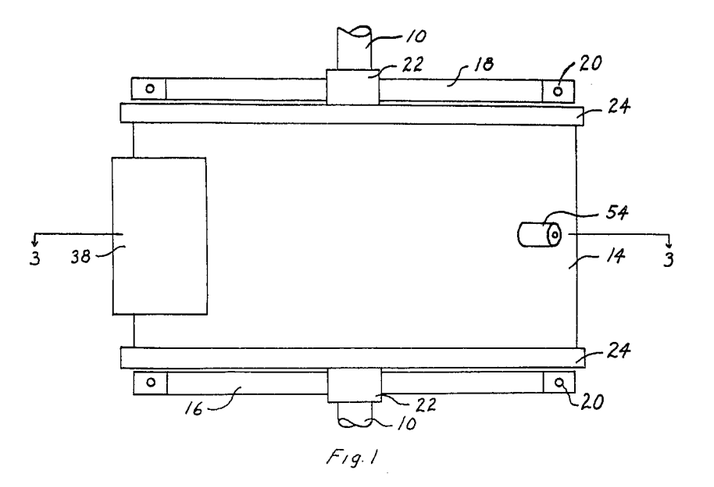
FIG. 1 is a plan view of an internal combustion rotary engine embodying my invention.
Figure 2:
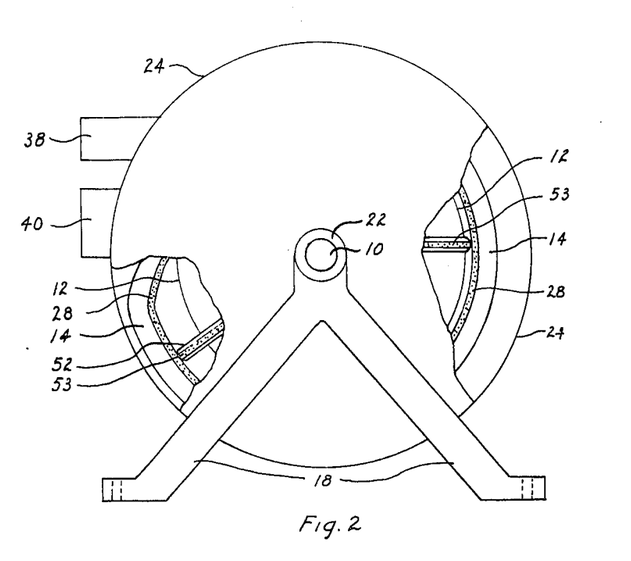
FIG. 2 is an end view of the engine of FIG. 1 with part broken away.
Figure 3:
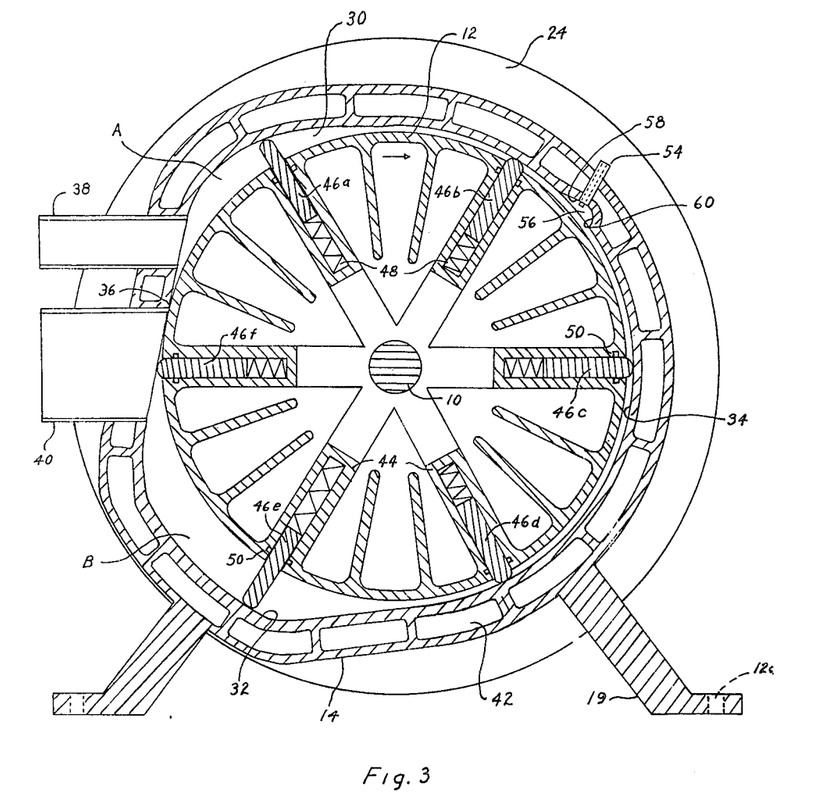
FIG. 3 is a sectional view along line 3—3 of FIG. 1 showing the interior of the engine.
Figure 4:
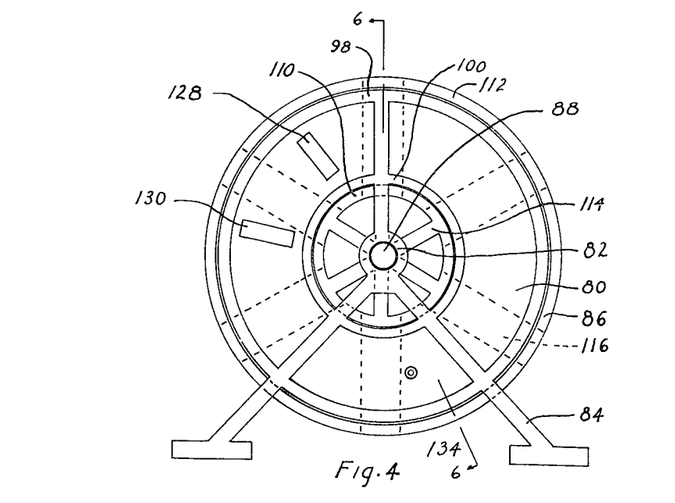
FIG. 4 is an end view of a further embodiment of a rotary engine embodying my invention.

Now referring to the drawings, FIGS. 1 to 3 illustrate one embodiment of my invention in which the constant volume combustion chamber is clearly illustrated. Rotor output shaft 10 is secured to a rotor 12 mounted and housed for rotary movement within hollow housing or stator 14. Engine base 16 includes end supporting legs 18, intermediate, stator legs 19, and suitable mounting bolt holes 20. Rotor shaft 10 is supported for rotation in bearing means 22 associated with base legs 18. Base 16 extends under stator 14 and supports it by legs 19 as more particularly shown in FIG. 3. Rotor end plates 24 are secured to rotor 12 and shaft 10 and rotate therewith. Sealing ring 28, generally of hardened steel is secured to and projects from each of stator 14 and engages the flat inner surface of the respective rotating end plate 24. An appropriate film of oil is provided by suitable lubrication means (not shown) between the inner surface of the end plates 24 and the ends of respective rings 28 whereby the hollow inner chamber 30 of stator 14 is effectively sealed from the outside.

The hollow inner chamber 30 of stator 14, supported by legs 19, comprises an interior shaped working fluid surface 32 which in cooperation with rotor 12 forms a plurality of operating members. More particularly stator chamber working fluid surface 32 has an internal arcuate surface portion 34 concentric with rotor 12 and enlarges with a gradual change in curvature before and after arc 34 into chambers A and B, chamber A being an air charge intake chamber and chamber B being the expansion chamber for burnt gases. Stator surface 32 is reduced at point 36 to provide a point of general tangency with rotor 12 and just sufficient clearance for proper working of the engine. Housing 14 has an air intake opening 38 between point 36 and chamber A to permit intake of an air charge. Exhaust opening or port 40 on the other side of point 36 and at the end of expansion chamber B permits exhaust of burnt and expanded gases to the atmosphere. The proximity of the point of tangency 36 and the exhaust port 40 provides almost complete exhaustion of burnt and expanded gases. Stator 14 comprises water jacket means 42, the water being circulated throughout the housing stator 14 as a cooling medium by suitable means (not shown).

Rotor 12 includes a plurality (six shown) of radial vane recesses 44, each of which will suitably accommodate a sliding vane 46. Vanes 46 are sealingly received within recesses 44 and are biased outwardly in known fashion, for example, by spring means 48 between the inner end of vanes 46 and recesses 44, the spring means extending across the complete width of recess 44 in order to evenly bias the vane 46 outwardly over its length. Vane sealing means 50 are located in the recesses 44 near the outer end thereof and seal the inner ends of the recesses from the working fluid and burnt gases. The sides 52 of vanes 46 adjacent the respective inner surface of end plates 24 include suitable sealing means 53 as there is relative movement due to reciprocation of the vanes.

Spring means 48 bias the vanes 46 outwardly so that the outer ends thereof abut against the inner working fluid surface 32 of stator chamber 30 thereby forming between each pair of adjacent vanes, a chamber variable in volume depending on the interior shape of surface 32. FIG. 3 shows an engine with 6 vanes but it will be appreciated by those skilled in this art that a lesser or greater number of vanes may be satisfactorily employed. The type and construction of vanes 46 does not specifically form a part of the invention but it will be appreciated that any of the well known sliding vanes may be employed provided that they effectively seal the various variable volume chambers from one another in cooperation with the inner surface 32 of the housing 14 and the outer surface of rotor 12. Furthermore, it will be appreciated that the radially reciprocal movement of vanes 46 may be controlled in known fashion by cam means (not shown) located adjacent the hub of the rotor 12 and suitable cam roller means (not shown) associated with each vane 46. Moreover movement of vanes 46 could be hydraulically controlled.

Ignition element 54 is located near the beginning of the arcuate concentric portion 34 and preferably in accordance with my invention element 54 is located from the inlet port 38 an arcuate distance approximately twice the arcuate distance between adjacent vanes 46 at the rotor periphery. In compression ignition engines element 54 will comprise a fuel injector nozzle preferably of the continuous spray type, but it will be appreciated by those skilled in the art that the engine may be operated as a spark ignition engine in which case element 54 will be a spark plug or similar igniter element. The engine may be operated as a spark ignition engine or as a compression ignition engine by changing the compression ratio in a manner which will be appreciated by those skilled in the art. Ignition element 54 is located in a recess 56 in the inner surface 32 of housing 14. Recess 56 comprises an inwardly sloping portion 58 in which ignition element 54 is actually located, about half way along the portion, and a curving portion 60 which meets the inner surface at approximately a right angle. The purpose of recess 56 will become more apparent in appreciating the operation of the engine shown in FIGS. 1 to 3 and to FIGS. 9 to 11 hereinafter referred to.

In operation, my engine performs the intake of an air chrge, its compression, ignition and combustion, expansion and exhaust in five distinct phases. Unlike the previously noted four cycle engines which include overlapping compression combustion and expansion phases, construction of rotary engines in accordance with my invention prevents overlapping of any phase in the cycle. With engines built according to my invention overlapping of induction and exhaust or compression, burning and expansion are not possible. Furthermore it is not possible nor necessary to change the timing of the firing of the air fuel charge in my engine with continuous injection, the speed of the engine being controlled by a quantity metering of a continuous flow of fuel into the combustion chamber.

Looking at FIG. 3 with the rotor turning in the direction of the arrow and assuming the engine is of the compression ignition type, a vane 46 moves from a position adjacent point 36, past intake port 38 to a position such as 46a and air is drawn into the chamber A through inlet 38. Induction of air continues for 60° of rotation until the following vane cuts off the intake port 38 in a 6 vane rotor. As the rotor further rotates air caught between the leading vane and the following vane is compressed until the leading vane passes through position 46b at which time as the leading vane approaches ignition element 54, the air charge is compressed to a minimum volume. Full compression is reached after approximately 120° rotation of the leading vane from inlet port 38 in a 6 vane rotor system. Further rotation of rotor 12 carries the leading vane past the continuous fuel spray ignition element 54 and fuel is preferably continually metered into the hot compressed air charge as the rotor turns carrying the leading vane to position 46c. As the fuel is injected into the hot compressed air charge it ignites and burns, combustion of this charge adjacent the ignition element taking place in a very confined space and at constant volume. With the ignition element 54 recessed in the stator 14 as previously described part of the compressed air charge carried between adjacent vanes moves into recess 56 picking up droplets of fuel and is deflected downwards by surface 60 into the main stream of the air charge being carried by the adjacent vanes through the spray area of the ignition element 54. This air/fuel mixture deflected from recess 56 causes increased turbulence and mixing of the fuel with the air charge while, when a vane passes over the recess, a small backward expansion or blow back of hot and burning gases is permitted entry into the following confined chamber between adjacent vanes thereby providing a constant burning of the injected fuel. This means provides a reduction in the explosive build up of pressure causing structural problems to and knock in the engine. Further reference to this aspect of the recess will be made hereinafter in conjunction with FIGS. 9 to 11.

As the leading vane continues to move from 46c to 46d combustion is still taking place at constant volume. The concentricity of the rotor 12 and inner surface 32 of housing 14 is such that combustion takes place at substantially constant volume and continues until substantially complete combustion has occurred thereby effectively separating the combustion and subsequent expansion phase into distinct phases. As rotor 12 rotates further the leading vane moves from position 46c into the expansion chamber B to position 46e and is biased outwardly in sealing contact with the inner surface 32 of housing 14 by spring 48. The burnt charge is permitted to expand fully behind and against the increased vane area of the leading vane and the rotor is forcibly rotated. The following vane 46, in moving from position 46e to 46f, completely pushes exhaust gases out exhaust opening 40 so that there is substantially no residual gases left in the chamber B. The expansion chamber B is of such size that the pressure of the exhaust gases drops fairly close to atmospheric pressure. Each vane 46 goes through the same sequence during each revolution of the rotor.

The length of arc 34 has been shown in FIG. 3 as approximately 180° but it should be appreciated that the length of arc necessary or required to achieve substantially complete burning of the fuel before expansion will depend upon the type of fuel used, the rotational speed of the rotor and the number of vanes. With respect to the number of vanes, the arcuate length 34, for example, in a six vane engine will include at least an initial, approximately 60° prior to ignition element 54 which portion is necessary in order to achieve complete compression prior to ignition and a further 40° subsequent to the ignition element 54 which portion is necessary in order that combustion of the fuel and air charge adjacent the following vane in any chamber will take place. To this 120° of arc through which the leading vane has rotated is a further arcuate portion of between approximately 20° to 40° through which the leading vane advances in order to maintain constant volume while the last of the fuel injected into the chamber has time to burn and liberate its energy at substantially constant volume, even though a portion of burning air charge blows back into the following chamber through recess 56 as the following vane passes over the ignition element 54.

With respect to this vinal 20° to 40° of arc of portion 34, it will be appreciated that the type of fuel and design speed of the engine will have an effect on the actual length thereof. In using a fuel with a short ignition delay and with continuous spraying and blow back, combustion will start more rapidly and less rotational arc of this portion will be necessary before substantially complete combustion will have occurred. Moreover, as more fuel per unit time is injected adding more heat to the engine cycle causing the rotor to turn faster, the rotational arc swept by the leading vane during the ignition and burning of the charge, will be greater than at a slower speed in order to achieve substantially complete combustion prior to expansion.

Two additional design features will affect the optimum length of arc for an engine namely, the amount of blow back permitted through recess 56 and whether additional agitation chambers in the form of recesses in the stator subsequent to recess 56 are employed. For example, if the equivalent of 5% of injection blows back into the following chamber, then the length of arc 34 subsequent to the initial 120° would not have to provide for its burning in the chamber under immediate burning as the blow-back portion would burn in the subsequent chamber (and initiate combustion of fuel subsequently injected therein). Agitation chambers, being recesses in the stator wall similar to recess 56 but subsequent thereto, would enhance turbulance in the combustion chamber and therefore the speed of combustion and this bear on the final length of arc required to achieve substantially complete combustion. In a four vane engine it will be appreciated, for example, that the initial part of arc 34 must be 90° in order to achieve complete compression prior to ignition and combustion. The length of the arc after the ignition element will include an additional 90° plus a further arc of from 10°–30° depending, as previously indicated, on the design speed of the engine and the ignition and burning characteristics of the fuel employed. The arcuate length of arc 34 in an eight vane engine using twice the length of arc between adjacent vanes plus approximately 20° – 40° for final burning would provide an arc 34 of approximately 110° – 130°. It is desired to burn the fuel completely and as quickly as possible, thereby keeping the number of degrees of constant volume rotation as low as possible and thus avoiding unnecessary heat loss to the coolant. Fuel, as previously noted, is continuously injected from ignition element 54, the quantity per unit time being metered or regulated in known fashion in accordance with the desired speed and power output of the engine. Exhaust chamber B is of sufficiently greater volumetric capacity than intake chamber A so that expansion in chamber B of the burnt gases continues until the pressure of the gases exhausted from exhaust port 40 have dropped to abut atmospheric pressure.

FIGS. 4 to 7 inclusive set forth a further embodiment of a rotary internal combustion engine embodying my invention. Stator 80 is secured through stator hub 82 to stator support legs 84. Rotor 86 is connected to shaft 88 which is supported for rotation by stator hub 82 and support thrust bearing 90, stator hub 82 providing a thrust-bearing support for one end of shaft 88. Support bearing 90 is supported by legs 92 and both support legs 84 and legs 92 have foot plates 94 for suitably mounting the motor to a flat surface or as required.

Figure 5:
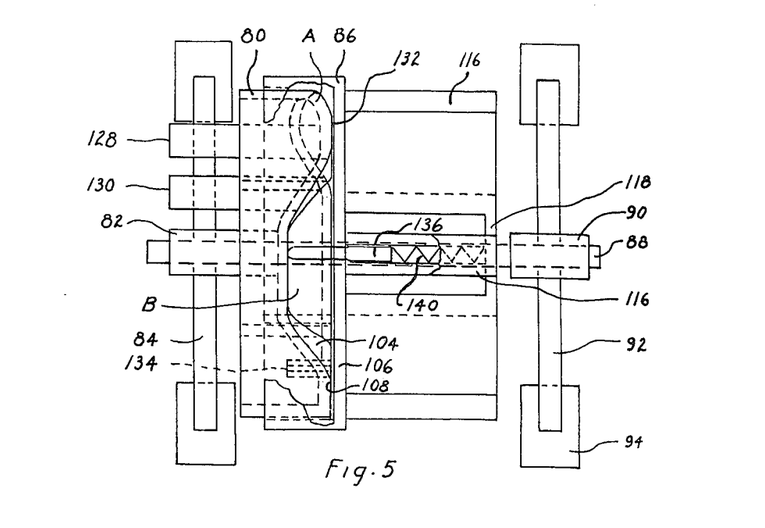
FIG. 5 is a plan view of the engine illustrated in FIG. 4.
Figure 6:
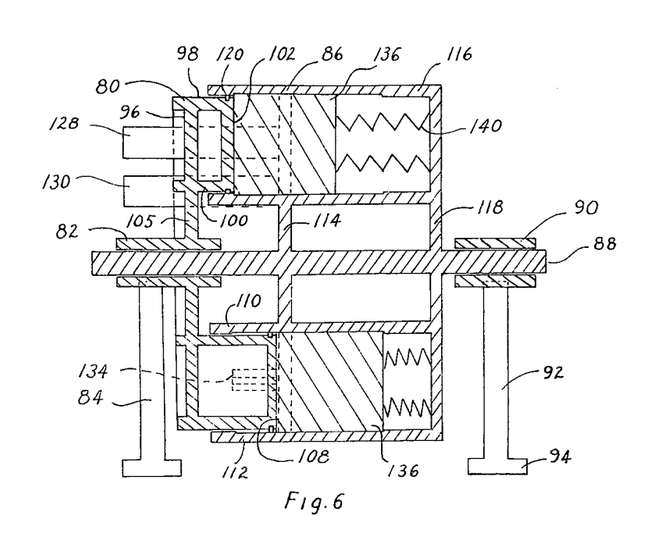
FIG. 6 is a sectional view of the engine taken along lines 6—6 of FIG. 4.
Figure 7:
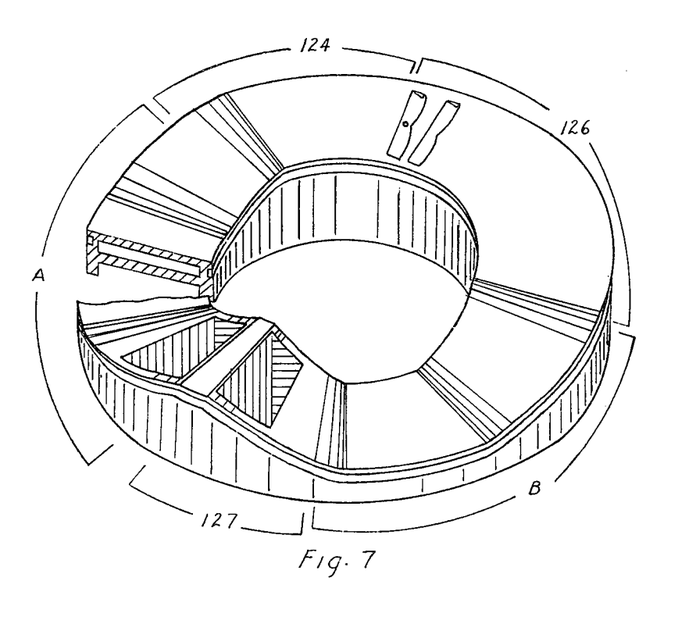
FIG. 7 is a perspective view of part of the embodiment of FIGS. 4–6, showing the stator working fluid surface.

Stator 80 is hollow to permit flow of a suitable cooling medium therethrough and comprises back 96, inner and outer sides 98, 100 respectively and front 102. Front 102 includes a working fluid surface 104 and stator front 102 and surface 104 circumferentially undulate as best seen in FIGS. 5 and 7 and as more fully described hereinafter. Back 96 is integral with stator supporting ribs 105 which are connected to bearing hub 82, it being appreciated that rotor 86, mounted to shaft 88 includes back 106 having an inner working rotor surface 108, inner and outer flanges 110 and 112 and support rib 114 to shaft 88. Rotor 86 further includes a plurality of vane housings 116 (six shown), each of which is shown integrally constructed with rotor back 106 and supported from shaft 88 by ribs 118. The inner surfaces of flanges 110 and 112 sealingly cooperated with the outer surfaces of stator sides 98 and 100 adjacent working fluid source 104. Accordingly, there is formed a sealed working fluid area between the opposed stator working fluid surface 104, inner rotor surface 108 and the inner surfaces of rotor flanges 110 and 112. Stator surface 104 is circumferentially contoured in such manner, as shown in FIG. 7 as to provide, in cooperation with rotor surface 108 and any two adjacent rotor vanes, an air intake chamber A, an air charge compression area 124, a constant volume combustion area 126, an expansion chamber B and an exhaust area 127, similar to those areas shownn in FIG. 3, area 126 being the arcuate segment wherein constant volume burning occurs and therefore similar to arcuate segment 34 in FIG. 3.

Intake and exhaust openings or ports 128 and 130 respectively, are provided through stator 80 to stator surface 104 and area 132 between the ports 129 and 130 provides separation of chambers A and B in the manner of area 36 in the embodiment shown in FIG. 3 and for the same purpose. An ignition element 134 shown in dotted outline in FIG. 4 and in solid outline in FIG. 5 is suitably located and connected with stator 80 in a fashion similar to ignition element 54 in FIG. 3. More particularly with the six vaned rotor, ignition element 134 is preferably located approximately 60° from the start of the point of minimum volume and 120° from intake port 128.

Vanes 136 are housed for reciprocation within vane housings 116 which, as previously noted are secured for rotation with rotor 86 about shaft 88. Vanes 136 and the inner surface of vane housings 116 include suitable sealing means and the vanes are biased toward contoured stator surface 104 by spring means 140. It will be appreciated, however, that other means may be used to maintain the ends of vanes 136 in contact with surface 104, such other means including a positive cam and cam track mechanism which provides for both inward and outward movement of the vanes in a manner such that the outer ends of vanes 136 follow the contour of surface 104. Such a mechanism is partially shown in FIG. 8 which illustrates a partially cut away, exploded view of a rotary engine of similar embodiment as that shown in FIGS. 4 to 7 inclusive but provided with a cam track mechanism for controlling movement of vanes 136.

Figure 8:
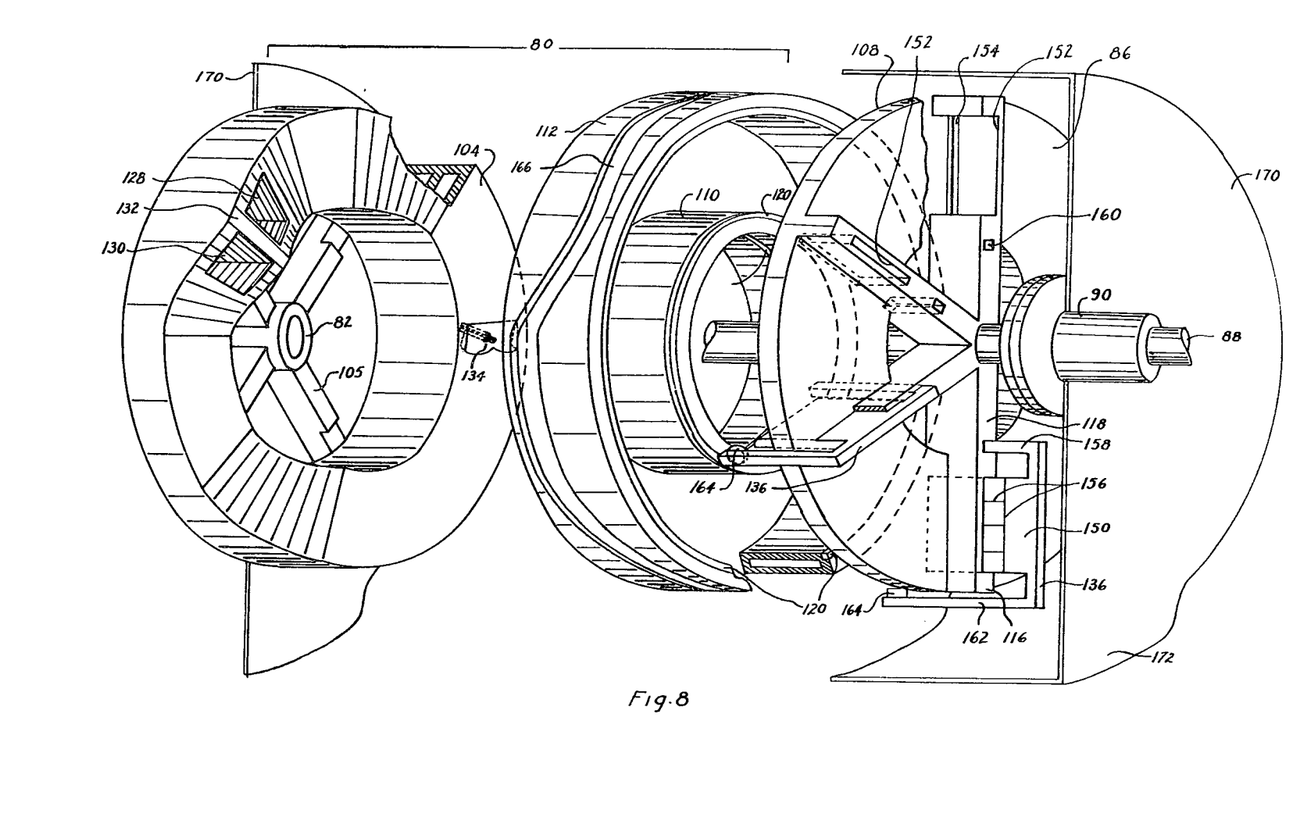
FIG. 8 is a partial, exploded view of a slightly modified embodiment of the engine of FIGS. 4–7.

In the modified embodiment of FIG. 8 stator 80 includes working fluid surface portion 104 and inner and outer side flanges 110 and 112 which although shown separated from surface portion 104 will be secured thereto by welding or by suitable bolting, or be integrally formed therewith. Rotor shaft 88 will receive support through stator thrust bearing means 82 suitably located in relation to stator 80 by rib means 105. It will be noted that flanges 110 and 112 formed part of the rotor 86 in the embodiment of FIGS. 4 to 7 whereas they form part of the stator 80 in the modified embodiment of FIG. 8. Piston rings 120 are located in the end edges of the inner and outer side flanges 110, 112 and cooperate with the end face 108 of rotor 86 to form the necessary chamber areas as previously noted. Rotor 86 in FIG. 8 includes six vane housings 116 which also act as support ribs 118 connecting plate-like rotor 86 to shaft 88. Vanes 136, only two actually shown for reasons of clarity, are mounted for reciprocal movement toward and away from working fluid surface 104 of stator 80 and includes central portion 150 passing through vane housing slot 152 and the end edge of which portion engages surface 104 and the side edges of which cooperate in sealing relation with the inner surface of the flange elements 110 and 112 to form the varying volume chambers as rotor 86 rotates. Central portion 150 of vanes 136 is received in vane housing slot 152 and sealing means 154 in slot 152 seals vane 136 during its reciprocal motion. Vanes 136 further carry oil grooves 156 on the upper part of central portion 150 for lubrication of the inside of vane housing 116, the engine being bathed in oil as more fully referred to herein. Vanes 136 further include inner arm 158 which extends through opening 160 in vane housing 116 and balances outer arm 162 which is outboard vane housing 116 and extending parallel to the axis of the motor. Arm 162 includes cam roller means 164 attached to the end thereof which roller means is suitably adapted to travel in cam track 166 formed in the outer side of flange 112 of the stator 80. It will be appreciated that rotor 86 could be made with a greater diameter wherein cam arms 162 would project through apertures (not shown) in the rotor plate which apertures would be similar to holes 160 and assist in guiding arms 162. Cam track 166, it will be appreciated, is formed in such fashion as to control reciprocal movement of vanes 136 in accordance with the requirements of stator working fluid surface 104. Although not specifically shown, inner arm 158 of vanes 136 carries can roller means, the mirror image of cam roller means 164, for engagement with cam track groove 168 on the inner periphery surface of side flange 110 thereby providing a balanced reciprocating vane system. It will be further appreciated that the vane cam track means may be located elsewhere than specifically shown in FIG. 8. For example, a rigid arm (not shown) could extend from the central portion of each vane radially inwardly for suitable connection with a centrally hollow circular cam track (not shown) held stationary through connection with the motor support frame or shaft thrust-bearing means 90 with shaft 88 extending through the hollow center of such cam track.

The engines of FIGS. 1 to 8 are provided with suitable means for lubricating the moving parts, as will be appreciated by those skilled in the art. The engine of FIG. 8, for example, is completely enclosed by an oil shield 170 which includes a sump 172. Oil is pumped form sump 172 through a filter-cooler and then circulated through rotor 86 as a coolant, being also sprayed into the central portion of said rotor to oil all moving parts such as the vanes and cam rollers. Rotation of the rotor causes the oil to be thrown from the rotor after it has suitably lubricated the moving parts, which oil collects on the shield and drains into the sump for recirculation.

The operation of the engines of FIGS. 4 to 8 is similar to that described in relation to FIG. 3. As a vane 136 moves past intake port 128, air is drawn into chamber A. As the next following vane passes over the intake part 128, a chamber is formed containing in air charge. As the rotor continues to rotate, the two vanes are forced inwardly either by the contour of the surface 104 in the case of spring vane biasing means or the contour of the cam track until both vanes are in their most reciprocally inward position. The air in the chamber between the vanes has thus been compressed fully. Continued rotation of rotor 86 causes the leading vane to expose the chamber containing the compressed air charge to ignition element 134 which continuously injects a metered amount of fuel into the chamber as it rotates past it. The fuel ignites and burns and combustion takes place while the chamber continues to be rotated under constant volume conditions through arcuate area 126. When substantially complete combustion has occurred, the gases are expanded in chamber B thereby forcibly pushing against the increased vane area of the leading vane which is biased outwardly by either the spring means or cam track mechanism and thereby causing rotation of rotor 86. The expanded gases are exhausted through exhaust port 130 at close to atmospheric pressure by the following vane of the chamber in question. Each juxtaposed set of vanes goes through the same operation thereby providing six power impulses per revolution of the rotor.

It will be appreciated that the length of arc 126 of stators 80 will depend on the same variables as previously noted with respect to arc 34 in the embodiment of FIGS. 1 to 3 inclusive. Further elaboration is not, accordingly, believed to be necessary.

Figure 9:
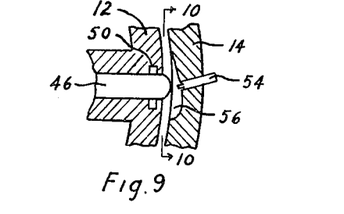
FIG. 9 is an enlarged view of the ignition element and recess as shown in FIG. 3.
Figure 10:
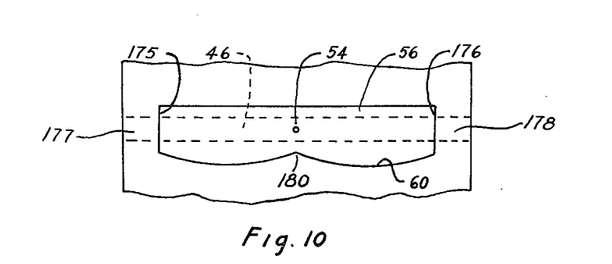
FIG. 10 is a view of the recess of FIG. 9 taken along line 10—10 thereof.

FIG. 9 shows an enlarged, sectional view of the ignition element and recess of the embodiment of FIG. 3. FIG. 10 shows recess 56 taken along line 10—10 of FIG. 9 wherein the vane 46 is shown in dotted lines. Recess 56 has edges 175 and 176 inwardly of the edges of stator 14 with the lands 177 and 178 of the stator in the area of recess 56 permitting the vane to ride over the recess. The surface 60 of recess 56 is scalloped with a center point 180, thus causing the portion of the air charge which enters recess 56 during injection of fuel into a chamber to diverge slightly outwardly as it is directed downwardly into the chamber, thereby enhancing turbulent mixing of injected fuel and air charge. When a vane 46 rides over recess 56 as shown in FIGS. 9 and 10 blow back of some burning air charge is permitted which assists in reducing the sudden explosive impact in the following air chamber of igniting fuel adjacent the leading vane and enhances ignition of the fuel being injected.

Figure 11:
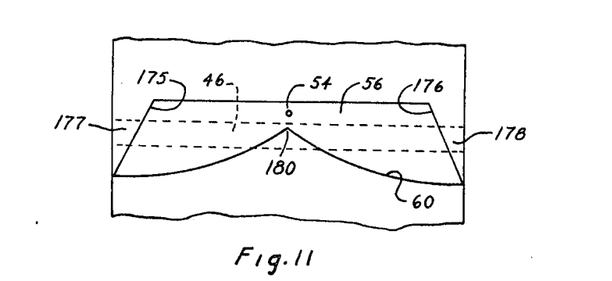
FIG. 11 is a view of a modified recess.

FIG. 11 shows a modified form of recess 56 wherein the sides 175 and 176 of the recess diverge outwardly to the edges of stator 14. Surface 60 is more pronouncely scalloped with point 180 providing support for vane 46 as it rides over recess 56 and lands 177 and 178 diminish in size.

It will be appreciated that although FIGS. 9 to 11 have made specific reference to the embodiment of FIGS. 1 to 3, the recess 134 of the embodiments of FIGS. 4 to 8 inclusive may be similarly constructed to provide enhanced turbulent mixing, yet permit blow back of some of the burning air charge.

The burning process in my engine is unique. In other engines fuel enters the engine either as a mixture of fuel and air which limits the compression ratio in order to avoid detonation prior to ignition, or as rapid injecting into a variable volume air chamber partly during the compression phase and partly during the expansion phase. Fuel burns by locating molecules of oxygen mostly while the air chamber is expanding during the expansion phase which results in a slow rate of burning during thhe later part of the expansion stroke.

In my engine, however, fuel may be injected at either a low or high compression ratio depending on whether the engine is spart ignition or compression ingition, in the former, the ignition element shown in the drawings herewith including fuel injection and a spark ignition element as is known in the art. Detonation is not possible because burning in my engine is continuous. The build up of an explosive mixture does not take place and accordingly the build up of pressure is quite smooth and spread over the period of time taken to supply fuel to a given chamber.

More specifically, in an engine such as shown in FIGS. 1 to 3, the fuel injection into any given chamber would be spread evenly over approximately 60° of rotation of the rotor. As a chamber between any two adjacent vanes reaches full compression the leading vane uncovers the edge of the recess 56, a turbulence enhancing means which also contains ignition element 54. Since the previous chamber has nearly completed the burning of its fuel charge and is near maximum pressure, part of the gases including the burning fuel most recently injected into the previous chamber will blow back into the following chamber raising the pressure therein. The amount of blow back is controlled by the depth and rotational length of the recess 56.

The blow back has two main accomplishments; firstly, it raises the pressure in the following chamber and the extra gases raise the density of the charge. Secondly, the gases blow back in a burning state and keep the burning in the engine continuous. Both of these accomplishments tend to speed up the burning process.

The burning process in my engine is quite similar to a jet of fuel burning in the open and not in the confines of a chamber. The air charge or pocket of air between adjacent vanes orbits past the ignition element and the recess 56 causes turbulence and thorough mixing of air and fuel immediately upon injection.

Fuel is continuously injected evenly and metered into the chamber between adjacent vanes as the air charge orbits past the ignition element, for a particular speed of engine rotation. Each radial slice of the air charge passes the ignition element and a metered amount of fuel is injected into that slice, the quantity of fuel and the amount of air in a slice being sufficient to provide substantially complete burning of the fuel at that point at the optimum design speed. Accordingly, a fresh slice of air is brought to the fuel injected continously resulting in rapid burning and complete burning of each portion of fuel. Burning should be substantially complete and at constant volume within 20° – 40° of rotation beyond the point of injection of the fuel.

It will be appreciated that minor modifications to the structure of these engines embodying my invention may be made without departing from the spirit thereof. It will be obvious to those skilled in the art that modified engines wherein the stator and rotor elements are reversed may be constructed without difficulty, taking into consideration the present teachings of prior art devices.

The embodiments of the invention in which an exclusive property of privilege is claimed are defined as follows:

1. A rotary internal combustion engine comprising:
   a stator having a working fluid surface, an air charge intake port and a gas exhaust port spaced from said intake port;
   a rotor having a working fluid surface and a plurality of vanes having outer ends, said vanes being equally spaced about said rotor surface and being mounted in said rotor for reciprocation perpendicular to said rotor surface and for maintaining said vane ends in contact with said stator working fluid surface, said rotor being mounted for rotation relative to said stator whereby said respective working fluid surfaces are in opposed cooperative association so as to form in association with any two adjacent rotor vanes a plurality of serially arranged and distinct chambers, said chambers being:
   an air intake chamber in association with said intake port;
   a compression chamber reducing in volume to a final compression chamber;
   a substantially constant volume combustion chamber;
   a gas expansion chamber; and
   an exhaust chamber in association with siad exhaust port, said intake chamber and said exhaust chamber being adjacent but substantially closed from each other;
   a portion of said stator working fluid surface being spaced a substantially constant distance from an opposed portion of the rotor working fluid surface for an arcuate length substantially greater than the distance between adjacent vane ends to form said final compression chamber and said constant volume combustion chamber;
   fuel injector means located in said stator working fluid surface at the end of said final compression chamber and at the beginning of said constant volume combustion chamber for delivering a predetermined amount of fuel at a predetermined rate into a constant volume chamber between adjacent vanes, said substantially constantly spaced portions of said working fluid surfaces in forming said constant volume combustion chamber having an arcuate length such that substantially complete constant volume combustion of a fired air charge occurs within said combustion chamber during a combustion phase.

2. The engine of claim 11 wherein said stator comprises an annular housing and said rotor is mounted for rotation within said housing, said substantially constantly spaced portion of said working surface provided by the stator working fluid surface and the rotor working fluid surface being concentric for a portion of their respective extent; and rotor end plates mounted for rotation with said rotor and sealingly cooperating with the ends of said annular housing to form said chambers.

3. The engine of claim 2 wherein said fuel injector means is located in a recess in the working fluid surface of said stator, said recess having a first surface, a second surface and a curved surface portion therebetween, said first surface sloping into the wall of said stator from said stator working fluid surface in the direction of rotation of said rotor and said second surface extending substantially radially from said intermediate curved portion to said stator surface, and said fuel injector means being located approximately in the middle of said first surface.

4. The engine of claim 1 wherein said stator comprises an annular disc having an inner edge and an outer edge, said stator working fluid surface being formed on a side of said disc and extending radially between said edges; said rotor mounted coaxially to said stator for rotation relative thereto and including an outer axially extending annular flange and an inner axially extending annular flange, said rotor working fluid surface extending radially between said annular flanges, said flanges sealingly cooperating with said outer and inner disc edges and said working fluid surfaces in opposed associations; said vanes being mounted in said rotor for axial reciprocal movement in association with said stator working fluid surface and forming in conjunction with said chambers.

5. The engine of claim 4 wherein said fuel injector means is located in a recess in said stator working fluid surface, said recess having a first surface, a second surface and a curved surface portion therebetween, said first surface sloping into said stator from said stator working fluid surface in the direction of rotation of said rotor and said second surface extending radially from said intermediate curved surface portion to said stator surface and said fuel injector means being located approximately in the middle of said first surface.

6. The engine of claim 1 wherein said stator comprises an annular disc having an inner axial extending flange and an outer axial extending flange, said stator working fluid surface being formed on a side of said disc and extending radially between said flanges; said rotor being mounted coaxially to said stator for rotation relative thereto and comprising a flat plate portion having a surface sealingly abutting the ends of said inner and outer stator flanges and a vane housing portion, said vanes being mounted in said vane housing portion for axial reciprocal movement in association with said stator working fluid surface and forming, in conjunction with said stator and rotor working surfaces said serially arranged distinct chambers.

7. The engine of claim 6 wherein said fuel injector means is located in a recess in said stator working fluid surface, said recess having a first surface, a second surface and a curved surface portion therebetween, said first surface sloping into said stator from said stator working fluid surface in the direction of rotation of said rotor and said second surface extending radially from said intermediate curved surface portion to said stator surface, and said fuel injector means being located approximately in the middle of said first surface.

8. The engine of claim 6 wherein said outer ends of said vanes are maintained in contact with said stator working fluid surface by spring means.

9. The engine of claim 6 wherein said outer ends of said vanes are maintained in contact with said stator working fluid surface by cam means.

10. The engine of claim 6 where said engine has six vanes and the arcuate length of said combustion chamber, after said fuel injector means, is approximately 80° – 120°.

11. The engine of claim 6 wherein said engine has at least six vanes and the arcuate length of said combustion chamber, after said fuel injector means, is approximately 65° – 85°.

12. The engine of claim 6 wherein said engine has at least four vanes and the arcuate length of said combustion chamber, after said fuel injector means, is approximately 100° – 120°.

13. The engine of claim 6 wherein said vane housing portion comprises radial ribs integral with said plate portion, each said ribs having a vane aperture therethrough for guidingly receiving a vane, a first annular cam track in the outer peripheral surface of said outer flange and a second annular cam track in the inner peripheral surface of said inner flange, said cam tracks following the contours of said stator working fluid surface, said vanes having radially spaced, axially extending inner and outer arm members, and cam roller means on the ends of said arm members which roller means are adapted to travel in said cam tracks for controlling reciprocation of said vanes in accordance with the contours of said stator working surface.

14. The engine of claim 6 wherein said fuel injector means is located in a recess in said stator working fluid surface for continuously injecting fuel in metered amounts during passage of an air charge in a chamber between two adjacent vanes, said recess having a first surface, a second surface and a curved surface portion therebetween, said first surface sloping into said stator from said stator working fluid surface in the direction of rotation of said rotor and said second surface extending radially from said intermediate curved surface portion to said stator surface, and said fuel injector means being located approximately at the middle of said first surface, said recess permitting blow back of some burning fuel into the following chamber and causing turbulence in the air charge.

15. The engine of claim 7 wherein said recess has a width less than the width of said stator working surface, has two opposed side edges, said second surface is scalloped inwardly from each side edge of said recess to a central point, and whereby air is directed outwardly from a central area of said recess.

16. The engine of claim 7 wherein said recess has two side edges which diverge respectively toward and meet the edges of said stator working surface, said second surface being scalloped inwardly from each side to a central point in advance of the junction of said side surfaces whereby air is directed outwardly from a central area of said recess.

17. The engine of claim 7 wherein at least one additional recess is provided in said stator working surface subsequent to said recess for enhancing turbulence during burning.

18. A rotary internal combustion engine including:
a stator having a working fluid surface, an air charge intake port and a gas exhaust port spaced from said intake port;
a rotor having a working fluid surface and a plurality of vanes having outer ends which vanes are equally spaced about said rotor surface and mounted in said rotor for reciprocation perpendicular to said rotor surface and for maintaining said vane ends in contact with said stator working fluid surface, said rotor being mounted for rotation relative to said stator whereby said respective working fluid surfaces are in opposed cooperative association, to form in association with any two adjacent rotor vanes a plurality of serially arranged and distinct chambers, said chambers being:
an air intake chamber in association with said intake port;
a compression chamber reducing in volume to a final compression chamber;
a substantially constant volume combustion chamber;
a gas expansion chamber; and
an exhaust chamber in association with said exhaust port, said intake chamber and said exhaust chamber being adjacent but substantially closed from each other;
a portion of said stator working fluid surface being spaced a substantially constant distance from an opposed portion of the rotor working fluid surface for an arcuate length substantially greater than the distance between adjacent vane ends to form said final compression chamber and said constant volume combustion chamber;
means for delivering a fuel-air mixture to said engine intake port;
ignition means located in said stator working fluid surface at the end of said final compression chamber and at the beginning of said constant volume combustion chamber for igniting a constant volume fuel-air charge between adjacent vanes, said substantially constantly spaced portions of said working fluid surfaces in forming said constant volume combustion chamber having an arcuate length such that substantially complete constant volume combustion of a fired air charge occurs within said combustion chamber during a combustion phase.

19. The engine of claim 18 wherein said stator comprises an annular housing and said rotor is mounted for rotation within said housing, said substantially constantly spaced portion of said working surface provided by the stator working fluid surface and the rotor working fluid surface being concentric for a portion of their respective extent; and rotor end plates mounted for rotation with said rotor and sealingly cooperating with the ends of said annular housing to form said chambers.

20. The engine of claim 19 wherein said ignition means is located in a recess in the working fluid surface of said stator, said recess having a first surface, a second surface and a curved surface portion therebetween, said first surface sloping into the wall of said stator from said stator working fluid surface in the direction of rotation of said rotor and said second surface extending radially from said intermediate curved surface portion to said surface and said ignition means being located approximately in the middle of said first surface.

21. The engine of claim 18 wherein said stator comprises an annular disc having an inner edge and an outer edge, said stator working fluid surface being formed on a side of said disc and extending radially between said edges; said rotor mounted coaxially to said stator for rotation relative thereto and including an outer extending annular flange and an inner axially extending annular flange, said rotor working fluid surfaces extending radially between said annular flanges, said flanges sealingly cooperating with said outer and inner disc edges and said working fluid surfaces in opposed associations; said being mounted in said rotor for axial reciprocal movement in association with said stator working fluid surface and forming in conjunction with said stator and rotor working surfaces said serially arranged distinct chambers.

22. The engine of claim 21 wherein said ingition means is located in a recess in said stator working fluid surface, said recess having a first surface, a second surface and a curved surface portion therebetween, said first surface sloping into said stator from said stator working fluid surface in the direction of rotation of said rotor and said second surface extending radially from said intermediate curved surface portion to said stator surface and said ignition means being located approximately in the middle of said first surface.

23. The engine of claim 18 wherein said stator comprises an annular disc having an inner axial extending flange and an outer axial extending flange, said stator working fluid surface being formed on a side of said disc and extending radially between said flanges; said rotor being mounted coaxially to said stator for rotation relative thereto and comprising a flat plate portion having a surface sealingly abutting the ends of said inner and outer stator flanges and a vane housing portion, said vanes being mounted in said vane housing portion for axial reciprocal movement in association with said stator working fluid surface and forming, in conjunction with said stator and rotor working surfaces said serially arranged distinct chambers.

24. The engine of claim 23 wherein said ignition means is located in a recess in said stator working fluid surface, said recess having a first surface, a second surface and a curved surface portion therebetween, said first surface sloping into said stator from said stator working fluid surface in the direction of rotation of said rotor and said second surface extending radially from said intermediate curved surface portion to said stator surface, and said ignition means being located approximately in the middle of said first surface.

25. The engine of claim 23 wherein said outer ends of said vanes are maintained in contact with said stator working fluid surface by spring means.

26. The engine of claim 23 wherein said outer ends of said vanes are maintained in contact with said stator working fluid surface by cam means.

27. The engine of claim 23 where said engine has six vanes and the arcuate length of said combustion chamber, after said ignition means is approximately 80° – 120°.

28. The engine of claim 23 wherein said engine has at least six vanes and the arcuate length of said combustion chamber, after said ignition means, is approximately 65° – 85°.

29. The engine of claim 23 wherein said engine has at least four vanes and the arcuate length of said combustion chamber, after said ignition means is approximately 100° – 120°.

30. The engine of claim 23 wherein said vane housing portion comprises radial ribs integral with said plate portion, each said ribs having a vane aperture therethrough for guidingly receiving a vane, a first annular cam track in the outer peripheral surface of said outer flange and a second annular cam track in the inner peripheral surface of said inner flange, said cam tracks following the contours of said stator working fluid surface, said vanes having radially spaced, axially extending inner and outer arm members, and cam roller means on the ends of said arm members which roller means are adapted to travel in said cam tracks for controlling reciprocation of said vanes in accordance with the contours of said stator working surface.

31. The engine of claim 23 wherein said ignition means is located in a recess in said stator working fluid surface, said recess having a first surface, a second surface and a curved surface portion therebetween, said first surface sloping into said stator from said stator working fluid surface in the direction of rotation of said rotor and said second surface extending radially from said intermediate curved surface portion to said stator surface, and said ignition means being located approximately at the middle of said first surface, said recess permitting blow back of some burning fuel into the following chamber and causing turbulence in the air charge.

32. The engine of claim 24 wherein said recess has a width less than the width of said stator working surface, has two opposed side edges, said second surface is scalloped inwardly from each side edge of said recess to a central point, and whereby air is directed outwardly from a central are of said recess.

33. The engine of claim 24 wherein said recess has two side edges which diverge respectively toward and meet the edges of said stator working surface, said second surface being scalloped inwardly from each side to a central point in advance of the junction of said side surfaces whereby air is directed outwardly from a central are of said recess.

34. The engine of claim 24 wherein at least one additional recess is proviced in said stator working surface subsequent to said recess for enhancing turbulence during burning.

* * * * *

Page 1 of 2

UNITED STATES PATENT OFFICE
CERTIFICATE OF CORRECTION

PATENT NO. : 3,929,105
DATED : December 30, 1975
INVENTOR(S) : Lloyd Duncan Chisholm It is certified that error appears in the above-identified patent and that said Letters Patent are hereby corrected as shown below:

Column 1, line 27: Change "a" to --in--;
Column 2, line 44: Change "folloing" to --following--;
Column 3, line 42: After "each" insert --end--;
line 53: Change "members to --chambers--;
Column 4, line 68: Change "chrge" to --charge--;
Column 6, line 33: Change "vinal" to --final--;
line 43: After "arc" insert --,--;
line 62: Change "this" to --thus--;
Column 7, line 47: Change "cooperated" to --cooperate--;
line 48: Change "source" to --surface--;
line 58: Change "shownn" to --shown--;
Column 9, line 5: Change "can" to --cam--;
line 8: Change "periphery" to --peripheral--;
line 24: Change "form" to --from--;
line 36: Change "part" to --port--;
Change "in" to --an--;
Column 10, line 41: Change "spart" to --spark--;
Change "ingition" to --ignition--;
Column 11, line 58: Change "siad" to --said--;
Column 12, line 14: Change "11" to --1--;
line 17: Change "surface" to --surfaces--;
line 48: After "said" insert --stator and rotor working surfaces said serially arranged distinct--;
Column 13, line 21: Change "where" to --wherein--;
Column 14, line 63 Change "surface" to --surfaces--;
Column 15, line 9: After "said", first occurrence insert -- stator --;
line 18: After "outer" insert --axially--;
line 20: Change "faces" to --face--;
line 23: Change "associations" to --association--;
After "said", first occurrence, insert --vanes--;

(Continued)

UNITED STATES PATENT OFFICE
CERTIFICATE OF CORRECTION

PATENT NO. : 3,929,105

DATED : December 30, 1975

INVENTOR(S) : Lloyd Duncan Chisholm

It is certified that error appears in the above—identified patent and that said Letters Patent are hereby corrected as shown below:

Column 16, line 7: Change "where" to --wherein--;
line 51: Change "are" to --area--;
line 58: Change "are" to --area--;
line 60: Change "proviced" to --provided--

Signed and Sealed this

Tenth Day of August 1976

[SEAL]

Attest:

RUTH C. MASON
*Attesting Officer*

C. MARSHALL DANN
*Commissioner of Patents and Trademarks*